(12) United States Patent
Kim et al.

(10) Patent No.: US 10,061,135 B2
(45) Date of Patent: Aug. 28, 2018

(54) STEREOSCOPIC IMAGE DISPLAY DEVICE

(71) Applicant: SAMSUNG DISPLAY CO., LTD., Yongin-si, Gyeonggi-Do (KR)

(72) Inventors: Young Chan Kim, Incheon (KR); Cheul Jin Park, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 224 days.

(21) Appl. No.: 14/931,608

(22) Filed: Nov. 3, 2015

(65) Prior Publication Data
US 2016/0161823 A1 Jun. 9, 2016

(30) Foreign Application Priority Data
Dec. 4, 2014 (KR) .......................... 10-2014-0173323

(51) Int. Cl.
*G02B 27/22* (2018.01)
*G02F 1/137* (2006.01)
(Continued)

(52) U.S. Cl.
CPC ......... *G02B 27/2214* (2013.01); *G02F 1/137* (2013.01); *G02F 1/1334* (2013.01);
(Continued)

(58) Field of Classification Search
CPC G02B 27/2214; G02B 27/22; G02B 27/2278; G02B 27/02; G02B 27/2207; G02B 27/2221; G02B 27/2228; G02B 27/2235; G02B 27/2242; G02B 27/225; G02B 27/2257; G02B 27/2264; G02B 27/26; G02B 27/28; G02B 21/20; G02B 21/22; G02B 3/0056; G02B 6/0053; G02B 27/24; H04N 13/0497; H04N 13/0475; H04N 13/0404; H04N 13/0402;
(Continued)

(56) References Cited

U.S. PATENT DOCUMENTS 6,864,951 B1 3/2005 Ren et al.
7,002,642 B2 2/2006 Jung
(Continued)

FOREIGN PATENT DOCUMENTS

JP 2011227381 11/2011
KR 100573082 4/2006
(Continued)

*Primary Examiner* — Edward Glick
*Assistant Examiner* — Shan Liu
(74) *Attorney, Agent, or Firm* — F. Chau & Associates, LLC

(57) ABSTRACT

A stereoscopic image display device includes a display panel for displaying an image; a liquid crystal lens layer positioned under the display panel that refracts light like a lenticular lens depending on application of power, the liquid crystal lens layer including a plurality of nano polymer-dispersed liquid crystals (PDLC); a barrier layer integrally formed under the liquid crystal lens layer that has a light transmitting position and width that change depending on a power applying position, the barrier layer including a plurality of reflective PDLCs; and a backlight unit (BLU) positioned under the barrier layer that is configured to provide light to the display panel.

16 Claims, 18 Drawing Sheets

(51) Int. Cl.
*G02F 1/1343* (2006.01)
*G02F 1/1334* (2006.01)
*H04N 13/04* (2006.01)

(52) U.S. Cl.
CPC ..... *G02F 1/134309* (2013.01); *H04N 13/042* (2013.01); *H04N 13/0404* (2013.01); *H04N 13/0475* (2013.01); *H04N 13/0497* (2013.01)

(58) Field of Classification Search
CPC ............... H04N 13/04; H04N 13/0406; H04N 13/0409; H04N 13/0411; H04N 13/0413; H04N 13/0415; H04N 13/0418; H04N 13/0422; H04N 13/0429; H04N 13/0431; H04N 13/0434; H04N 13/0436; H04N 13/0438; H04N 13/0459; H04N 13/0055; H04N 13/00; H04N 21/8146; H04N 21/816; H04N 2213/00; H04N 2213/001; H04N 2213/002; H04N 13/0425; H04N 13/0427; H04N 13/044; H04N 13/0443; H04N 13/0452; H04N 13/0454; H04N 13/0456; H04N 13/0468; H04N 13/047; H04N 13/0472; H04N 13/0477; H04N 13/0479; H04N 13/0484; H04N 13/0486; H04N 13/0488; H04N 13/049; H04N 13/0493; H04N 13/0495; H04N 2013/0461; H04N 2013/0463; H04N 2013/0465; H04N 2213/008; H04N 13/042; H04N 13/0445; H04N 13/0447; H04N 13/045; H04N 13/0481; G03B 23/12; G03B 35/18; G03B 35/20; G03B 35/22; G03B 35/16; G03B 35/24; G03B 35/26; G03B 21/602; G03B 21/625; G03B 25/02; G01N 2223/414; G06T 15/00; G06T 19/20; G06T 2200/04; G06T 2207/10021; G06K 2209/40; G11B 2020/10611; H01J 31/22; A63F 2250/307; G01S 7/20; G01S 7/52068; G02F 1/29; G02F 1/133526; G02F 1/133621; G02F 1/133512; G02F 2001/133607; G02F 1/13452; G02F 2001/133317; G02F 1/133615

USPC ............... 349/15, 200, 95, 57; 359/462–477; 348/42, 51–60
See application file for complete search history.

(56) References Cited

U.S. PATENT DOCUMENTS

| | | | |
|---|---|---|---|
| 7,018,686 B2 | 3/2006 | Sutehrland et al. | |
| 7,042,549 B1* | 5/2006 | Ren | C09K 19/02 349/13 |
| 2001/0028501 A1* | 10/2001 | Hunter | G02F 1/135 359/449 |
| 2004/0095524 A1* | 5/2004 | Date | G02B 6/005 349/89 |
| 2006/0209371 A1* | 9/2006 | Hamagishi | H04N 13/0411 359/15 |
| 2007/0296896 A1* | 12/2007 | Hong | G02B 27/2214 349/122 |
| 2011/0157497 A1* | 6/2011 | Kim | G02B 27/2214 349/15 |
| 2012/0019733 A1* | 1/2012 | Kim | G02B 27/2214 349/15 |
| 2012/0208637 A1* | 8/2012 | Hirakata | G02F 1/1334 463/31 |
| 2013/0308067 A1* | 11/2013 | Hashimoto | G02B 27/2214 349/15 |
| 2015/0131013 A1* | 5/2015 | Chen | G02F 1/29 349/15 |
| 2015/0185487 A1* | 7/2015 | Lee | G02F 1/1336 349/15 |
| 2016/0011427 A1* | 1/2016 | Lin | G02F 1/29 349/15 |
| 2016/0091727 A1* | 3/2016 | Yoon | G02B 27/26 349/1 |
| 2017/0048515 A1* | 2/2017 | Imai | G03B 35/24 |

FOREIGN PATENT DOCUMENTS

| | | |
|---|---|---|
| KR | 1020080043610 | 5/2008 |
| KR | 101074574 | 10/2011 |
| KR | 1020120095212 | 8/2012 |

* cited by examiner

STEREOSCOPIC IMAGE DISPLAY DEVICE

CROSS REFERENCE TO RELATED APPLICATIONS

This application claims priority from Korean Patent Application No. 10-2014-0173323 filed in the Korean Intellectual Property Office on Dec. 4, 2014, and all the benefits accruing therefrom, the contents of which are herein incorporated by reference in their entirety.

BACKGROUND

1. Technical Field

Embodiments of the present disclosure are generally directed to a stereoscopic image display device, and more particularly, to a stereoscopic image display device capable of performing a mutual conversion between a 2 dimension (2D) image and a 3D image.

2. Discussion of the Related Art

Among various technology developments, a demand for and development of a stereoscopic image display which does not use glasses has continuously progressed.

To display a 3D image without using glasses in an existing flat display device, binocular disparity is used, in which the left and right eyes of an observer view different images. The method is traditionally implemented using a lenticular lens or a parallax barrier. A method using only a lenticular lens or a parallax barrier may implement a 3D image, but is affected by issues such as resolution deterioration, moiré patterns, etc. Therefore, methods such as simultaneously using a barrier and a lens, have been studied.

One issue in existing display devices having a 2D image/3D image conversion structure is that the resolution of 3D image deteriorates more than that of the 2D image. To improve the resolution, a direction controllable backlight unit (BLU) method has been adopted, which controls light emitted from a backlight unit (BLU).

In a general LCD structure, a direction controllable BLU method can temporally separate and control directions of light emitted from a backlight unit (BLU) by combining a parallax barrier and a lenticular lens between a display panel and the backlight unit that can effectively switch between a 2D image and a 3D image without changing resolution.

However, most autostereoscopic 3D structures are characterized in that a 3D image may only be perceived at a specific distance from the display device, and it can be challenging for a user to find that specific distance.

A lenticular lens and a parallax barrier are typical devices for controlling light distribution for displaying a 3D image in an conventional direction BLU structure. Basically, a parallax barrier is an active device such as a liquid crystal (LC) that can transmit/block an optical path, and a lenticular lens is a passive device in a film form.

A lenticular lens film can separate the optical path of the left and right eyes to display a 3D image, however, only users who are at a specific distance may perceive the 3D image due to a fixed curvature radius. A viewing distance may be partially controlled based on positions before and after a user has moved by controlling a width of a barrier but issues of luminance deterioration, the occurrence of dark portions, etc., remain.

SUMMARY

Embodiments of the present disclosure can provide a structure which may optimize light distribution in a display device depending on a user position to enable a user to more easily perceive a 3D image.

Embodiments of the present disclosure can provide an autostereoscopic 3D image display device structure capable of extending a viewing distance from a display device while maintaining resolution and luminance equivalent to a 2D image.

An exemplary embodiment provides a stereoscopic image display device including: a display panel for displaying an image; a liquid crystal lens layer positioned under the display panel that refracts light like a lenticular lens depending on an application of power, the liquid crystal lens layer including a plurality of nano polymer-dispersed liquid crystals (PDLC); a barrier layer integrally formed under the liquid crystal lens layer that has a light transmitting position and width that change depending on a power applying position, the barrier layer including a plurality of reflective PDLCs; and a backlight unit (BLU) positioned under the barrier layer for providing light to the display panel.

The liquid crystal lens layer may include a first substrate, a second substrate that faces the first substrate, a nano PDLC layer interposed between the first substrate and the second substrate that includes the nano PDLC, and a plurality of first lower electrodes disposed on the first substrate and a plurality of first upper electrodes disposed on the second substrate.

The nano PDLC are randomly distributed in the nano PDLC layer, and a refractive index of the liquid crystal lens layer may change by forming the nano PDLC into a lenticular lens whose shape depends on a position of the first upper electrodes to which power is applied.

The liquid crystal lens layer may include liquid crystal lenses having a small curvature radius to shorten a focal distance and a light transmitting width of the barrier layer, when a viewer is closer than an optimal viewing distance.

The liquid crystal lens layer may include the liquid crystal lens having a large curvature radius to lengthen a focal distance and a light transmitting width of the barrier layer, when a viewer is further than an optimal viewing distance.

The liquid crystal lens layer may not change an optical path of light emitted from the backlight unit when implementing a 2D image by blocking power applied to the first upper electrode and the first lower electrodes.

The liquid crystal lens layer may supply power to all of the first lower electrodes and some of the first upper electrodes depending on a curvature radius of the liquid crystal lens, to change an optical path of light emitted from the backlight unit.

The curvature radius of the liquid crystal lens may be determined by an interval between the first upper electrodes to which power is applied.

The barrier layer may include a third substrate, a fourth substrate that faces the third substrate, a reflective PDLC layer interposed between the third substrate and the fourth substrate that includes the reflective PDLCs, and a plurality of second lower electrodes disposed on the third substrate and a second upper electrode disposed on a fourth substrate.

A light transmitting width of the barrier layer may change depending on a position of an interval between second lower electrodes to which power is applied.

The barrier layer may not change an optical path of light emitted from the backlight unit when implementing a 2D image by blocking power applied to the second upper electrode and the second lower electrodes.

The barrier layer may supply power to the second upper electrode and to alternating groups of one or more second lower electrodes to control a path of light propagating to a viewer's left and right eyes.

The barrier layer reflects light toward the backlight unit in a region in which the second lower electrode is supplied with power and transmits light in a region in which the second lower electrode is not supplied with power.

A size of the nano PDLC of the liquid crystal lens layer may vary by position.

Another embodiment provides a stereoscopic image display device including: a display panel for displaying an image; a liquid crystal lens layer disposed under a display panel that refracts light like a lenticular lens depending on application of power, said liquid crystal lens layer including a liquid crystal; a barrier layer integrally formed under the liquid crystal lens layer that has a light transmitting position and width that change depending on a power applying position, the barrier layer including a plurality of reflective polymer-dispersed liquid crystals; and a backlight unit (BLU) positioned under the barrier layer for providing light to the display panel.

Another embodiment provides a stereoscopic image display device, including: a liquid crystal lens layer that includes a first substrate, a second substrate that faces the first substrate, a nano PDLC layer interposed between the first substrate and the second substrate that includes a plurality of nano polymer-dispersed liquid crystals (PDLC), and a plurality of first lower electrodes disposed on the first substrate and a plurality of first upper electrodes disposed on the second substrate, wherein a refractive index of the liquid crystal lens layer is changed by forming the nano PDLC into a lenticular lens whose shape depends on a position of the first upper electrodes to which power is applied, and a barrier layer integrally formed under the liquid crystal lens layer that includes a third substrate, a fourth substrate that faces the third substrate, a reflective PDLC layer interposed between the third substrate and fourth substrate that includes a plurality of reflective PDLCs, and a plurality of second lower electrodes disposed on the third substrate and a second upper electrode disposed on the fourth substrate, wherein a light transmitting width and position of the barrier layer changes depending on a position of an interval between second lower electrodes to which power is applied.

The stereoscopic image display device may further include a display panel positioned over the liquid crystal lens layer that is configured to display an image, and a backlight unit (BLU) positioned under the barrier layer that is configured to provide light to the display panel.

The liquid crystal lens layer may supply power to all of the first lower electrodes and to some of the first upper electrodes depending on a curvature radius of the liquid crystal lens, to change an optical path of light emitted from the backlight unit, wherein the curvature radius of the liquid crystal lens is determined by an interval between first upper electrodes to which power is applied.

The barrier layer may supply power to the second upper electrode and to alternating groups of one or more second lower electrodes to control a path of light propagating to a viewer's left and right eyes, wherein the barrier layer reflects light toward the backlight unit in a region in which the second lower electrode is supplied with power and transmits light in a region in which the second lower electrode is not supplied with power.

According to an exemplary embodiment, a stereoscopic image display device may allow a viewer to easily implement the 3D image when converting a 2D image to a 3D image by tracking a distance between a display device and the viewer.

Further, viewing convenience may be improved by allowing the viewer to view a 3D image over a much wider range, so that the viewer need not remain positioned at a fixed distance from the display device.

Further, it is possible to implement a high-resolution autostereoscopic 3D image having the same resolution as a 2D image.

Further, it is possible to reduce the power consumption of a 3D image by implementing a 3D image having a luminance equal to or greater than that of a 2D image.

Further, it is possible to implement a 3D optical structure when implementing a 3D image without light loss, while preventing the damage to the image by assuring the same optical structure as existing conventional display device that can implement a 2D image.

DETAILED DESCRIPTION

Figure 1:
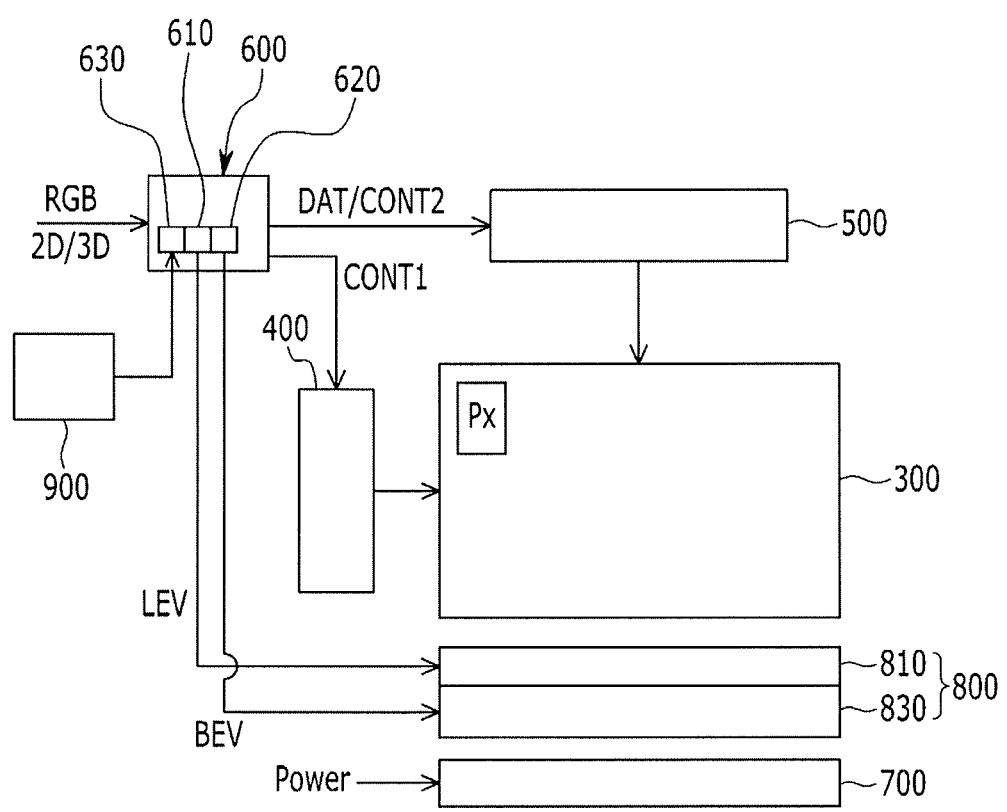
FIG. 1 schematically illustrates a stereoscopic image display device according to an exemplary embodiment.

Hereinafter, the present disclosure will be described more fully with reference to the accompanying drawings, in which exemplary embodiments of the disclosure are shown. As those skilled in the art would realize, the described embodiments may be modified in various different ways, all without departing from the spirit or scope of the present disclosure.

It is to be noted that the accompanying drawings are schematically illustrated and are not illustrated to a scale. Further, the same structures, elements, or parts which are illustrated in at least two drawings may be denoted by the same reference numerals, which is used to indicate similar features. The mention that any portion is present "over" or "on" another portion means that any portion may be directly formed on another portion or a third portion may be interposed between one portion and another portion.

Hereinafter, a stereoscopic image display device according to an exemplary embodiment will be described in detail with reference to FIGS. 1 to 4.

FIG. 1 schematically illustrates a stereoscopic image display device according to an exemplary embodiment. Referring to FIG. 1, a stereoscopic image display device includes a display panel 300 that can display an image, a switching panel 800 disposed under the display panel 300 that can convert between a 2D image and a 3D image depending on an application of power, and a backlight unit (BLU) 700 disposed under the switching panel 800 that can provide light to the display panel 300.

A gate driver 400 and a data driver 500 are connected to a signal processor 600 and provide signals for displaying an image on the display panel 300. Further, the signal processor 600 can be provided with a 2D image or a 3D image signal and is can be provided with distance information between a viewer and the display panel 300, sensed by a distance measurement sensor 900. The distance information is transmitted to a receiver 630 in the signal processor 600 and then to a barrier layer output unit 620, and a barrier layer output voltage BEV is thus transmitted to a barrier layer 830 along with a 2D image signal or a 3D image signal. Further, the distance information is transmitted from the receiver 630 to a liquid crystal lens layer output unit 610, and a liquid crystal lens layer voltage LEV is transmitted to a liquid crystal lens layer 810 along with a 2D image signal or a 3D image signal.

Figure 2:
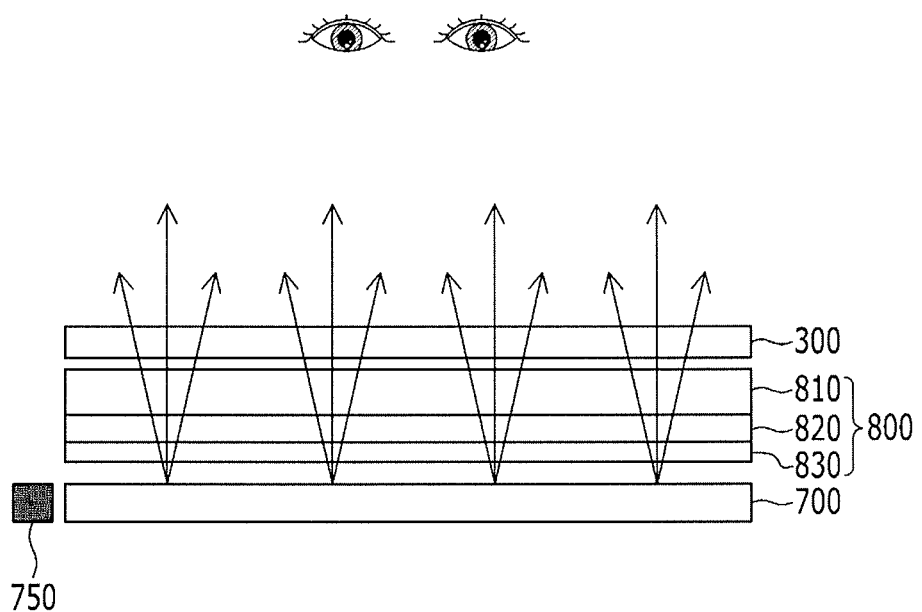
FIG. 2 schematically illustrates a switching panel of a stereoscopic image display device according to an exemplary embodiment implementing a 2D image.
Figure 3:
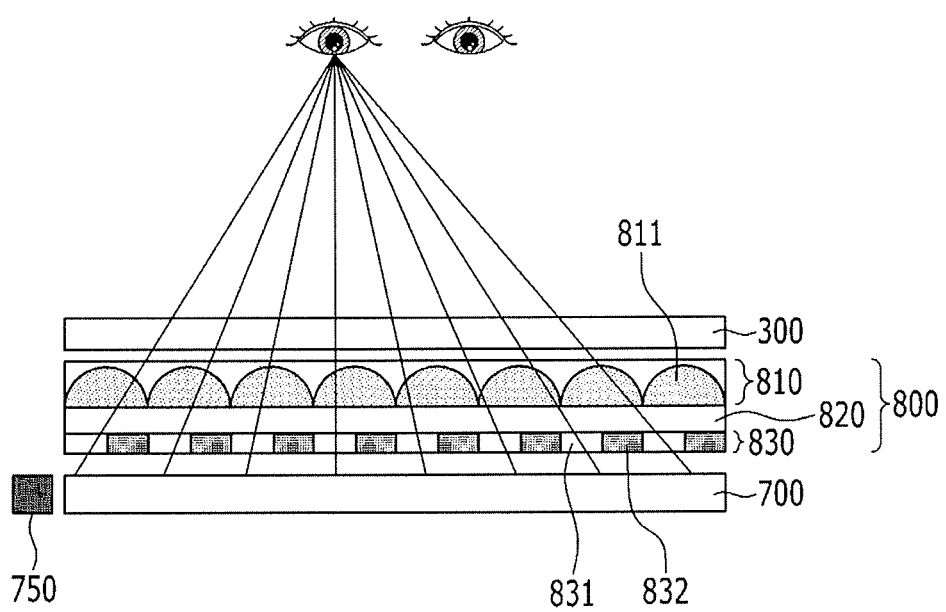
FIG. 3 schematically illustrates a switching panel of a stereoscopic image display device according to an exemplary embodiment implementing a 3D image.

FIG. 2 schematically illustrates a switching panel of a stereoscopic image display device according to an exemplary embodiment implementing a 2D image and FIG. 3 schematically illustrates a switching panel of an stereoscopic image display device according to an exemplary embodiment implementing a 3D image.

Referring to FIG. 2, the switching panel 800 includes a barrier layer 830 positioned over the backlight unit 700 and a liquid crystal lens layer 810 positioned over the barrier layer 830. A light source 750 provides light to the backlight unit. An interval between the liquid crystal lens layer 810 and the barrier layer 830 is maintained by an interval layer 820. The barrier layer 830 has a light transmitting position and width that may change depending on the application of power, and includes reflective polymer-dispersed liquid crystals (PDLC), and the liquid crystal lens layer 810, which includes nano PDLCs, is integrally formed with the barrier layer 830 and refracts light like a lenticular lens, depending on the application of power.

When a 2D image signal is received from the signal processor 600, no power is applied to the switching panel 800 and the 2D image is displayed on the display panel 300. That is, the liquid crystal lens layer 810 and the barrier layer 830 of the switching panel 800 are not supplied with power and light emitted from the backlight unit 700 is not refracted and propagates toward the display panel 300 without changing its path.

Referring to FIG. 3, when a 3D image signal is received from the signal processor 600, power is applied to the switching panel 800 and the 3D image is displayed on the display panel 300. The nano PDLC in the liquid crystal lens layer 810 aligns in a specific direction and thus light passing through the barrier layer 830 from the backlight unit 700 is refracted and changes its path. The nano PDLC of the liquid crystal lens layer 810 aligns in a lens shape and has a specific curvature radius.

Meanwhile, when 3D image signal is received from the signal processor 600, the barrier layer 830 is also supplied with power and thus the reflective PDLC are driven to control an optical path of the light propagating toward the left and right eyes. The light then propagates through the lens-aligned nano PDLC in the liquid crystal lens layer 810 to be incident on the left eye or the right eye of a viewer, so that a 3D image may be perceived.

Figure 4:
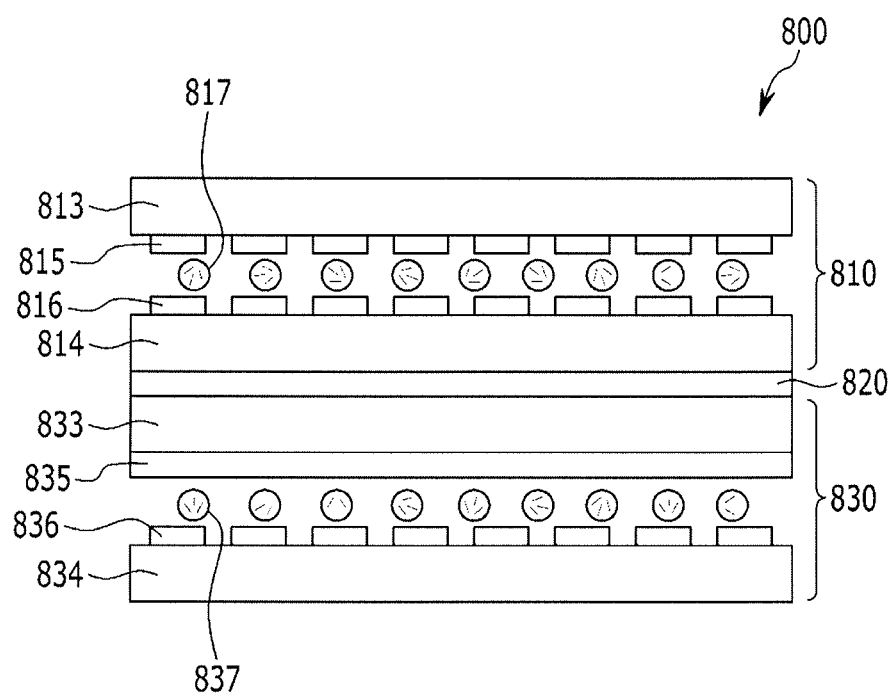
FIG. 4 schematically illustrates a switching panel of a stereoscopic image display device according to an exemplary embodiment.

FIG. 4 schematically illustrates a switching panel of a stereoscopic image display device according to an exemplary embodiment. Referring to FIG. 4, the liquid crystal lens layer 810 includes a first substrate 814, a nano PDLC layer which is formed over the first substrate 814 and includes nano PDLC 817, and a second substrate 813 which is formed over the nano PDLC layer. A plurality of first lower electrodes 816 are disposed on an upper surface of the first substrate 814 and a plurality of first upper electrodes 815 are disposed on a lower surface of the second substrate 813. That is, the first lower electrodes 816 and the first upper electrodes 815 face each other and the nano PDLC layer is interposed between the first substrate 814 and the second substrate 813.

In addition, the barrier layer 830 includes a third substrate 834, a reflective PDLC layer which is formed over the third substrate 834 and includes the reflective PDLC, and a fourth substrate 833 which is formed over the reflective PDLC layer. A plurality of second lower electrodes 836 are disposed on an upper surface of the third substrate 834 and a second upper electrode 835 is disposed on a lower surface of the fourth substrate 833. That is, the second lower electrode 836 and the second upper electrode 835 face each other and the reflective PDLC layer is interposed between the third substrate 834 and the fourth substrate 833.

Figure 5:
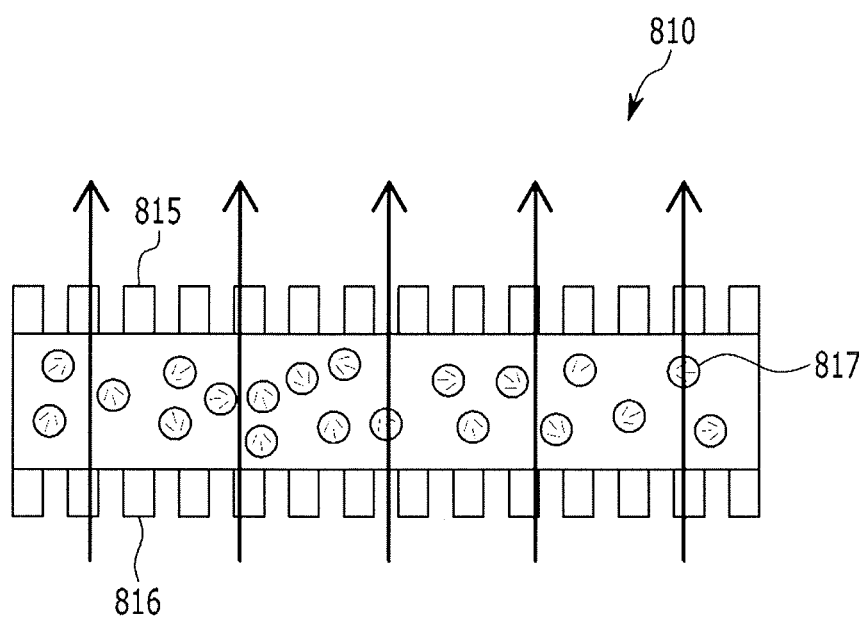
FIG. 5 schematically illustrates how a liquid crystal lens layer according to an exemplary embodiment implements a 2D image.

FIG. 5 schematically illustrates how a liquid crystal lens layer according to an exemplary embodiment implements a 2D image. Referring to FIG. 5, when a stereoscopic image display device implements a 2D image, power is not applied to the first upper electrode 815 or the first lower electrode 816. Light emitted from the backlight unit 700 propagates without changing its path, thereby implementing a 2D image.

Figure 6:
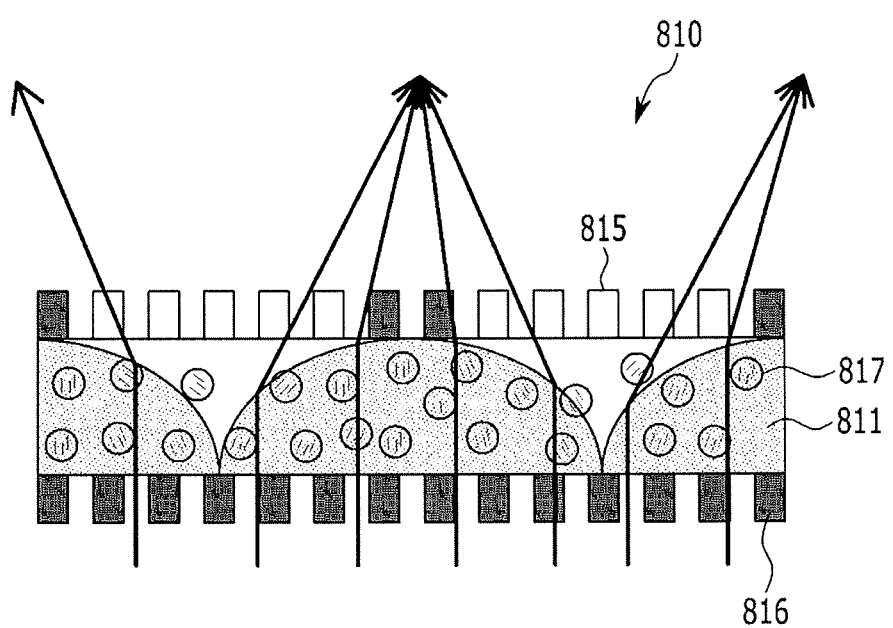
FIG. 6 schematically illustrates implementing a 3D image when a curvature radius of a liquid crystal lens layer according to an exemplary embodiment is large.
Figure 7:
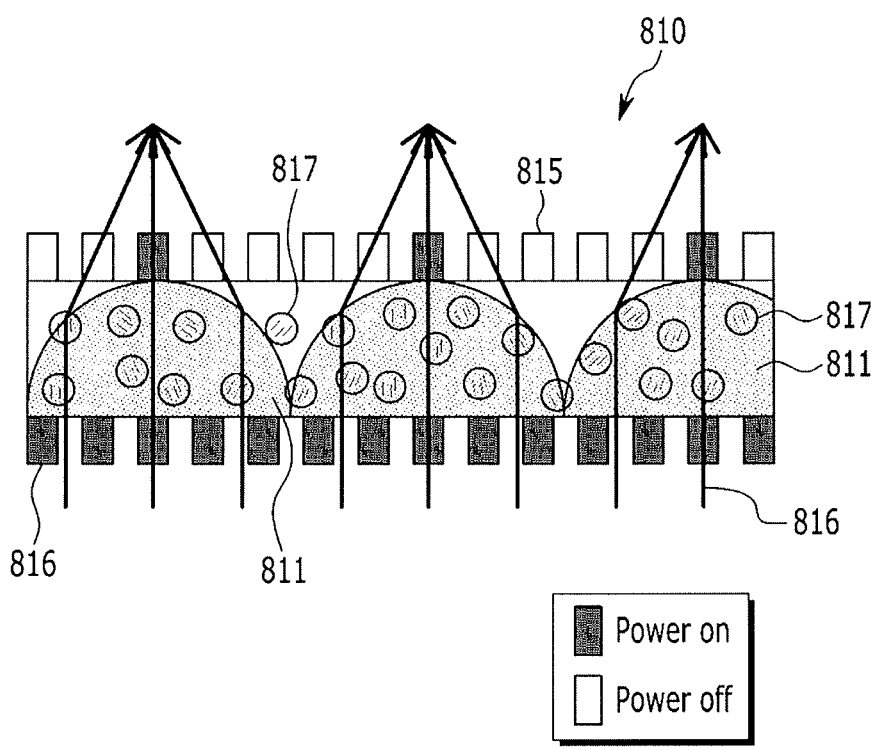
FIG. 7 schematically illustrates implementing a 3D image when a curvature radius of a liquid crystal lens layer according to an exemplary embodiment is small.

FIG. 6 schematically illustrates implementing a 3D image when a curvature radius of a liquid crystal lens layer according to an exemplary embodiment is large and FIG. 7 schematically illustrates implementing a 3D image when a curvature radius of a liquid crystal lens layer according to an exemplary embodiment is small.

Referring to FIG. 6, when the stereoscopic image display device implements a 3D image, power is supplied to all of the plurality of first lower electrodes 816 and partially supplied to the first upper electrodes 815, depending on the curvature radius to be implemented, which changes the path of light emitted from the backlight unit 700. As illustrated in FIG. 6, power is supplied to the first lower electrode 816 and to pairs of adjacent upper electrodes 815 that are spaced apart from each other by a predetermined interval. The nano PDLCs 817 are aligned in a vertical direction in the vicinity of the first lower electrode 816 and those nano PDLCs 817 in the vicinity of the first upper electrodes 815 to which power is applied are aligned toward those first upper electrodes 815. As a result, the nano PDLCs 817 align in a lens shape and thus light emitted from the backlight unit 700 propagates to converge to one point. As illustrated in FIG. 7, when power is applied to individual electrodes 815 spaced apart from each other by a predetermined interval, the nano PDLC 817 becomes a liquid crystal lens having a small curvature radius.

Figure 8:
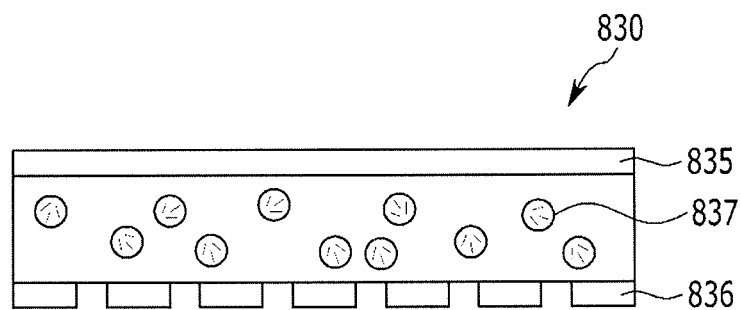
FIG. 8 schematically illustrates how a barrier layer according to an exemplary embodiment implements a 2D image.
Figure 9:
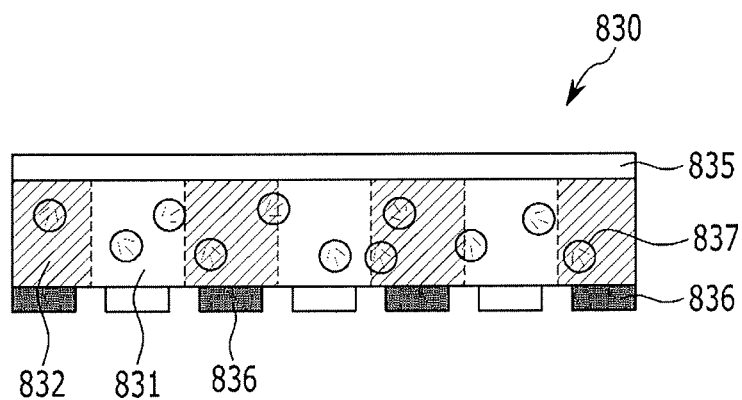
FIG. 9 schematically illustrates how a barrier layer according to an exemplary embodiment implements a 3D image.

FIG. 8 schematically illustrates how a barrier layer according to an exemplary embodiment implements a 2D image, and FIG. 9 schematically illustrates how a barrier layer according to an exemplary embodiment implements a 3D image.

Referring to FIG. 8, when the barrier layer 830 implements a 2D image, no power is applied to the second upper electrode 835 or the plurality of second lower electrodes 836. Since no power is applied to the electrodes 835 and 836, the reflective PDLCs 837 are randomly disposed and light emitted from the backlight unit 700 propagates without changing its path.

Referring to FIG. 9, power is supplied to the second upper electrode 835 of the barrier layer 830 and to alternate groups of one or more second lower electrodes 836. In a region proximal to those second lower electrodes 836 supplied with power, due to the reflective PDLCs 837, light emitted from the backlight unit 700 does not propagate toward the display panel 300 but is reflected back toward the backlight unit 700, and in a region proximal to those second lower electrodes 836 not supplied with power, light propagates toward the display panel 300. Therefore, when implementing a 3D image, the barrier layer 830 has a structure in which a light transmitting region 831 and a light blocking/reflecting region 832 are alternately disposed.

Figure 10:
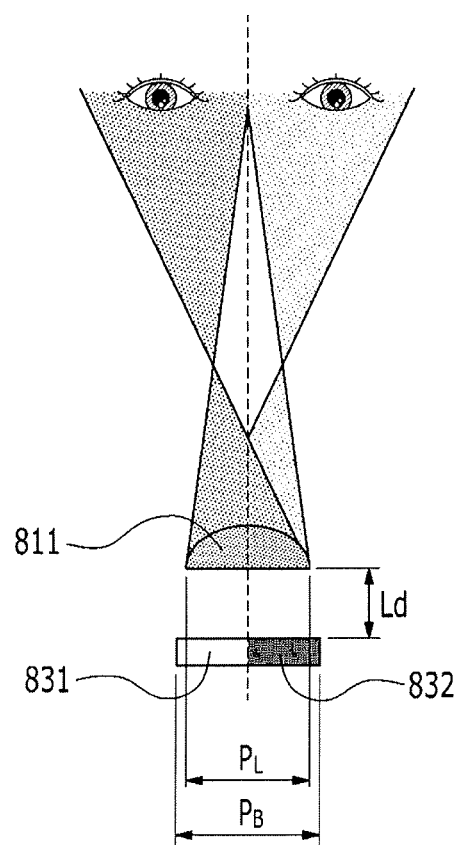
FIG. 10 illustrates a correlation between the lens curvature radius of a liquid crystal lens layer and a light transmitting width of a barrier layer when a viewer is at an optimal viewing distance, according to an exemplary embodiment.

FIG. 10 illustrates a correlation between the lens curvature radius of a liquid crystal lens layer and a light transmitting width of a barrier layer when a viewer is at an optimal viewing distance, according to an exemplary embodiment. Referring to FIG. 10, when implementing a 3D image, the plurality of second lower electrodes 836 of the barrier layer 830 alternate between a light transmitting region 831 and a light blocking region 832, and a light transmitting width $P_B$ of the barrier layer 830 is set to be equal to a left and right width $P_L$ of the liquid crystal lens 811 of the liquid crystal lens layer 810. The curvature radius of the liquid crystal lens 811 is set to define a focal distance so that a viewer's position corresponds to an optimal viewing distance. An interval between the liquid crystal lens layer 810 and the barrier layer 830 is fixed to be a predetermined distance $L_d$ by the interval layer 820.

Figure 11:
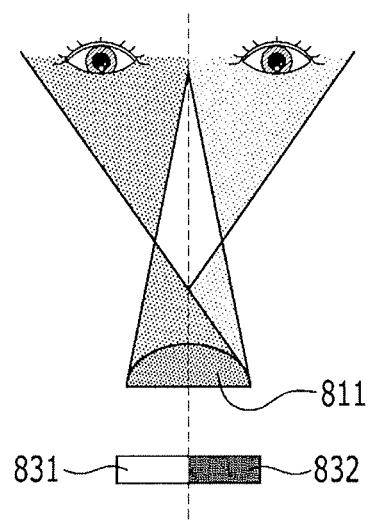
FIG. 11 illustrates a correlation between the lens curvature radius of a liquid crystal lens layer and a light transmitting width of a barrier layer when a viewer is closer than the optimal viewing distance, according to an exemplary embodiment.

FIG. 11 illustrates a correlation between the lens curvature radius of a liquid crystal lens layer and a light transmitting width of a barrier layer when a viewer is closer than the optimal viewing distance, according to an exemplary embodiment. Referring to FIG. 11, when the viewer is closer than the optimal viewing distance, the curvature radius of the liquid crystal lens 811 of the liquid crystal lens layer 810 becomes shorter than that for the optimal viewing distance to shorten the focal distance and the light transmitting width of the barrier layer 830, so that the width of the liquid crystal lens 811 is equal to the light transmitting width of the barrier layer 830.

Figure 12:
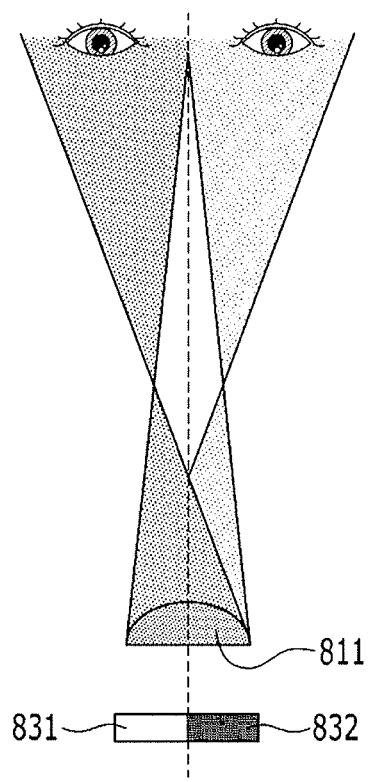
FIG. 12 illustrates a correlation between the lens curvature radius of a liquid crystal lens layer and a light transmitting width of a barrier layer when a viewer is further than the optimal viewing distance, according to an exemplary embodiment.

FIG. 12 illustrates a correlation between the lens curvature radius of a liquid crystal lens layer and a light transmitting width of a barrier layer when a viewer is further than the optimal viewing distance, according to an exemplary embodiment. Referring to FIG. 12, when the viewer is further than the optimal viewing distance, the curvature radius of the liquid crystal lens 811 becomes longer than that for the optimal viewing distance to lengthen the focal distance and the light transmitting width of the barrier layer 830, so that the width of the liquid crystal lens 811 is equal to the light transmitting width of the barrier layer 830, thereby suppressing generation of crosstalk.

The light transmitting width of the barrier layer 830 may be adjusted depending on the position of the power supplied to the second lower electrode 836 of the barrier layer 830, and thus light propagates only to the defined lens, thereby preventing image deterioration due to crosstalk and white and dark lines. By this control, a viewer may easily view a 3D image even when moving back and forth.

Figure 13:
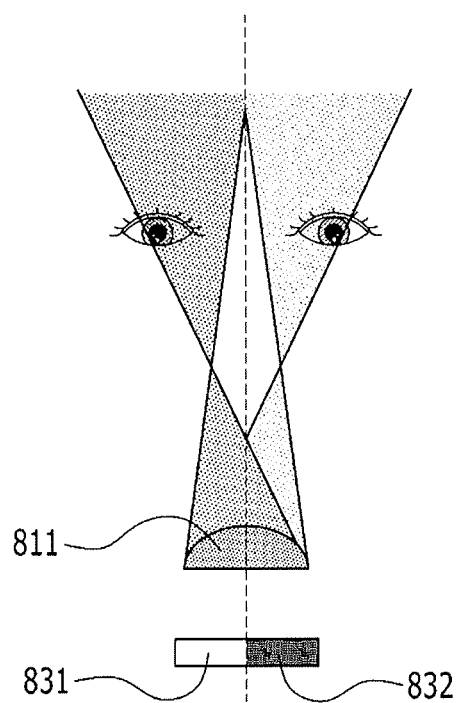
FIG. 13 illustrates a dark line generated when a conventional fixed liquid crystal lens layer and barrier layer are provided.
Figure 14:
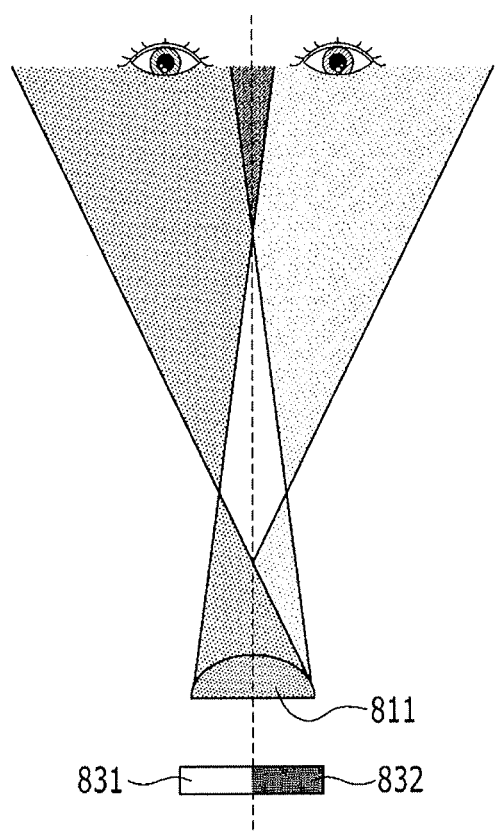
FIG. 14 illustrates crosstalk generated when a conventional fixed liquid crystal lens layer and barrier layer are provided.

FIG. 13 illustrates a dark line generated when a conventional fixed lenticular lens layer and barrier layer are provided, and FIG. 14 illustrates crosstalk generated when a conventional fixed lenticular lens layer and barrier layer are provided.

In a structure that uses a conventional fixed lenticular lens 811 to view a 3D image, the viewing distance, which is associated with the curvature radius of the lenticular lens 811, should be kept constant. As illustrated in FIG. 13, when the viewer is closer than the optimal viewing distance, a dark line region is generated between both of the viewer's eyes and edges of both of the viewer's eyes extend beyond the viewing region. As illustrated in FIG. 14, when a viewer is further than the optimal viewing distance, a crosstalk region is generated between both of the viewer's eyes, and thus the image may be perceived as broken or overlapping, etc. when moving left and right. To address this situation, the optical path needs to be controlled by the curvature radius of the lenticular lens 811 of the liquid crystal lens layer 810 and the position and light transmitting width of the barrier layer 830.

Figure 15:
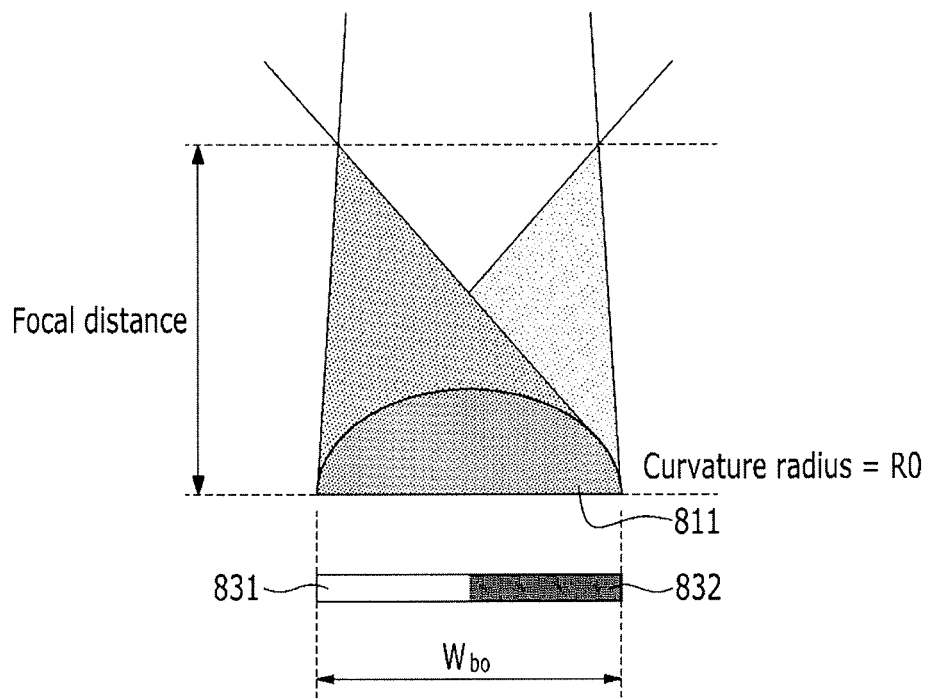
FIG. 15 illustrates a correlation between light transmitting regions of a liquid crystal lens layer and a barrier layer when a viewer is at an optimal viewing distance, according to an exemplary embodiment.
Figure 16:
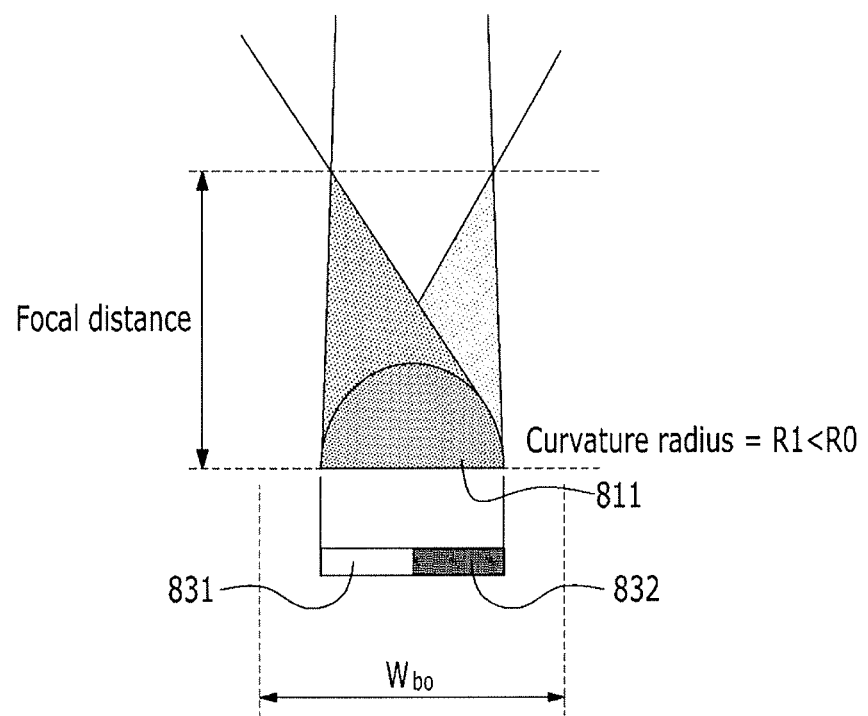
FIG. 16 illustrates a correlation between light transmitting regions of a liquid crystal lens layer and a barrier layer when a viewer is closer than an optimal viewing distance, according to an exemplary embodiment.
Figure 17:
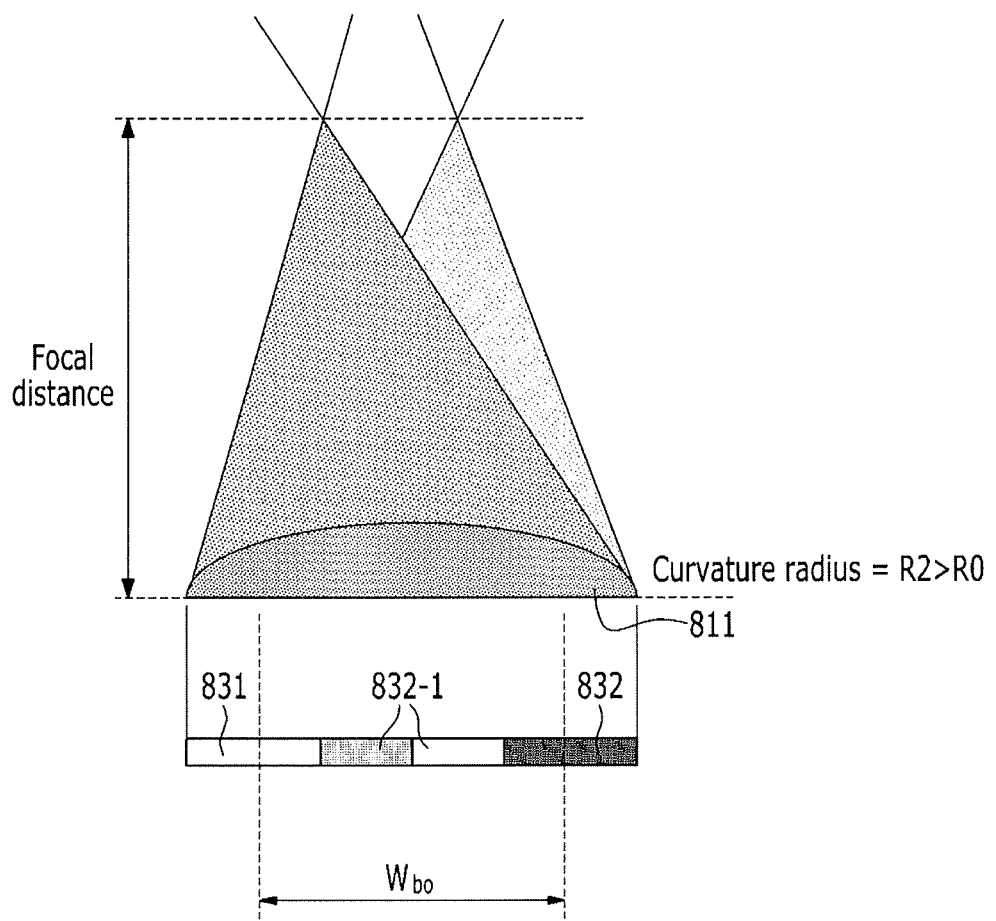
FIG. 17 illustrates a correlation between light transmitting regions of a liquid crystal lens layer and a barrier layer when a viewer is further than an optimal viewing distance, according to an exemplary embodiment.

FIG. 15 illustrates a correlation between light transmitting regions of a liquid crystal lens layer and a barrier layer when a viewer is at the optimal viewing distance, according to an exemplary embodiment, FIG. 16 illustrates a correlation between light transmitting regions of a liquid crystal lens layer and a barrier layer when a viewer is closer than the optimal viewing distance, according to an exemplary embodiment, and FIG. 17 illustrates a correlation between light transmitting regions of a liquid crystal lens layer and a barrier layer when a viewer is further than the optimal viewing distance, according to an exemplary embodiment.

Referring to FIG. 15, when a viewer is at the optimal viewing distance, the curvature radius of the liquid crystal lens 811 is R0, the light transmitting width of the barrier layer 830 is Wbo, and the width of the liquid crystal lens 811 is equal to the light transmitting width of the barrier layer 830.

Referring to FIG. 16, the curvature radius of the liquid crystal lens 811 is R1, which is less than R0, and the light transmitting width of the barrier layer 830 is correspondingly less than Wbo, and thus the width of the liquid crystal lens 811 is equal to the light transmitting width of the barrier layer 830.

On the contrary, referring to FIG. 17, the curvature radius of the liquid crystal lens 811 is R2, which is greater than R0, which increases the focal distance and the optimal light transmitting width of the barrier layer 830, which is the width for which no crosstalk is generated, to be greater than Wbo, so that the width of the liquid crystal lens 811 is equal to the light transmitting width of the barrier layer 830. In this case, along with the change in the light transmitting width of the barrier layer 830, there is now a reflective region 832-1 in a central portion through which no light is transmitted, and light from the reflective region 832-1 is reflected toward the backlight unit 700 and is again re-circulated by a method for emitting light from the backlight unit 700 toward the display panel 300. The position movement and light transmitting width of the reflective PDLC barrier layer may change depending on which second lower electrodes 836 receive power, and light propagates only to the defined liquid crystal lens layer 810, and some light is reflected and absorbed to improve light efficiency, remove crosstalk and suppress the occurrence of dark lines.

Figure 18:
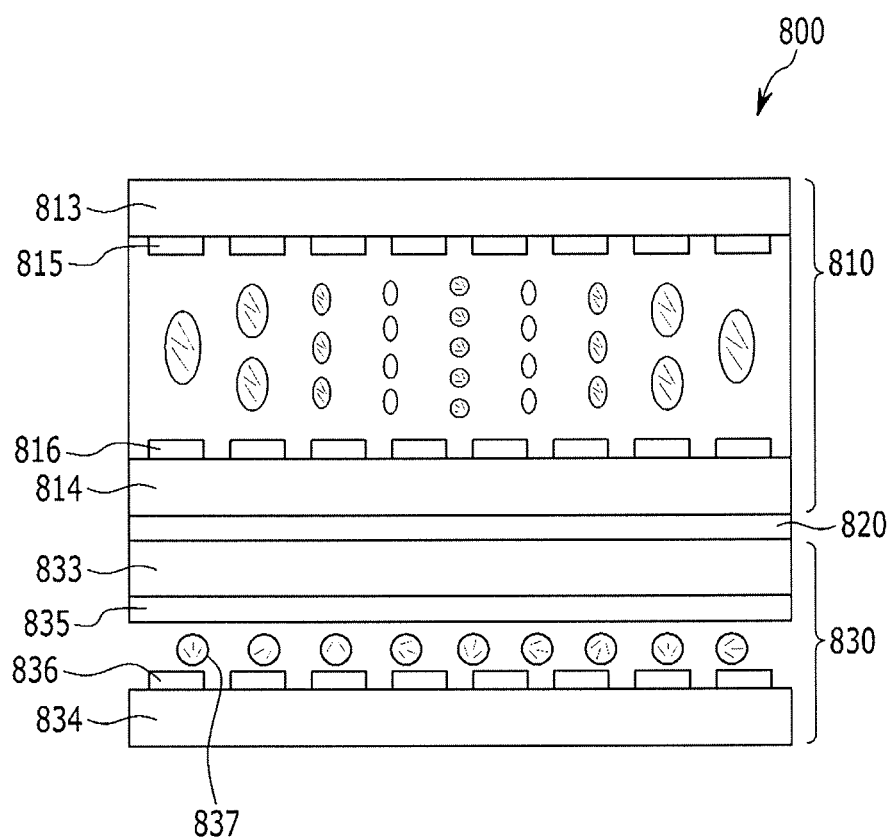
FIG. 18 schematically illustrates a switching panel of a stereoscopic image display device according to another exemplary embodiment.

FIG. 18 schematically illustrates a switching panel of a stereoscopic image display device according to another exemplary embodiment. As illustrated in FIG. 18, changing the lens shape using the nano PDLC layer may change the focal distance by changing effective refractive indexes at each position based on a magnitude of applied voltage. The effective refractive indices at each position may be changed by having the size of the nano PDLCs of the liquid crystal lens layer 810 vary by position and changing the magnitude of the applied voltage.

As illustrated in FIG. 18, smaller nano PDLCs 817 are disposed at the central portion of the liquid crystal lens layer 810, while larger nano PDLCs 817 are disposed at an edge portion thereof, and a non-zero voltage may be applied to change the refractive index of the liquid crystal lens layer 810. The refractive indices of the lens may be changed at each position by the applied voltage, and regions having larger nano PDLCs will have larger differences in the refractive indices, depending on the applied voltage, and regions having smaller nano PDLCs will have smaller differences in the refractive indices, depending on the applied voltage.

Figure 19:
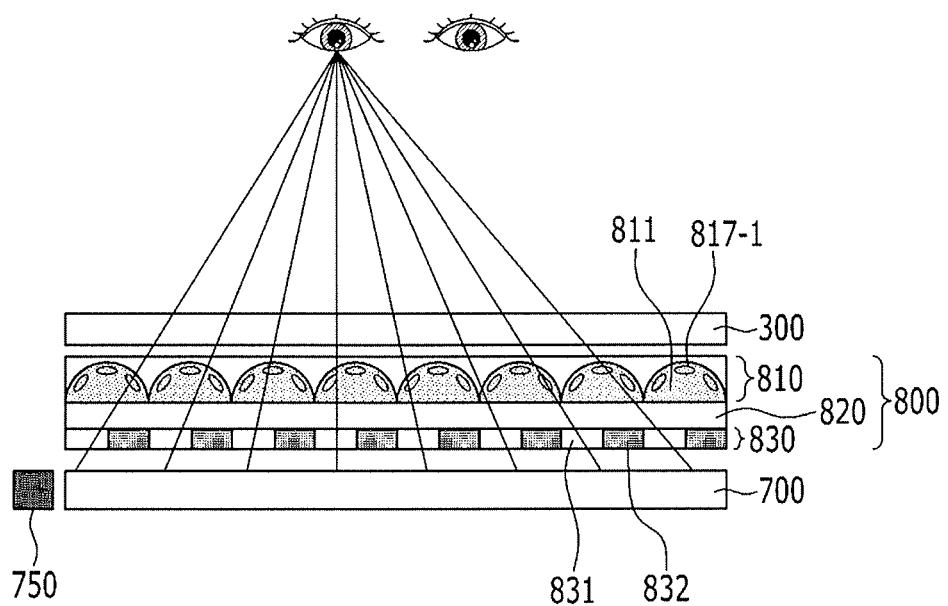
FIG. 19 schematically illustrates a switching panel of a stereoscopic image display device according to another exemplary embodiment.

FIG. 19 schematically illustrates a switching panel of a stereoscopic image display device according to another exemplary embodiment. Referring to FIG. 19, the switching panel 800 of a stereoscopic image display device includes the barrier layer 830, reflective polymer-dispersed liquid crystals (PDLC), and the liquid crystal lens layer 810 which includes a liquid crystal 817-1 lenticular lens. The liquid crystal 817-1 forms a lens shape due to the application of voltage and thus can serve as a lenticular lens.

As described above, according to an exemplary embodiment, a stereoscopic image display device may allow a viewer to easily implement a 3D image when converting a 2D image to a 3D image by tracking a distance between the display device and the viewer. Further, viewing convenience may be improved by allowing the viewer to view a 3D image over a much wider range, so the viewer need not remain positioned at a fixed distance from the display device. Further, it is possible to implement a high-resolution autostereoscopic 3D image having the same resolution as a 2D image. Further, it is possible to reduce power consumption of a 3D image by implementing a 3D image having a luminance equal to or greater than that of a 2D image. Further, it is possible to implement a 3D optical structure when implementing a 3D image without light loss, while preventing damage to the image by assuring the same optical structure as a conventional display device that implements a 2D image.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A stereoscopic image display device, comprising:
a display panel configured to display an image;
a liquid crystal lens layer positioned under the display panel, said liquid crystal lens layer including a first substrate, a second substrate that faces the first substrate, a nano polymer-dispersed liquid crystal (PDLC) layer interposed between the first substrate and the second substrate that includes a plurality of nano polymer-dispersed liquid crystals (PDLCs), and a plurality of first lower electrodes disposed on the first substrate and a plurality of first upper electrodes disposed on the second substrate,
wherein the nano PDLCs are randomly distributed in the nano PDLC layer, and a refractive index of the liquid crystal lens layer is changed by forming the nano PDLCs into a lenticular lens whose shape depends on a position of the first upper electrodes to which power is applied;
a barrier layer integrally formed under the liquid crystal lens layer that has a light transmitting position and width that change depending on a power applying position, said barrier layer including a plurality of reflective PDLCs; and
a backlight unit (BLU) positioned under the barrier layer that is configured to provide light to the display panel.

2. The stereoscopic image display device of claim 1, wherein:
the liquid crystal lens layer includes liquid crystal lenses having a small curvature radius to shorten a focal distance and a light transmitting width of the barrier layer, when a viewer is closer than an optimal viewing distance.

3. The stereoscopic image display device of claim 1, wherein:
the liquid crystal lens layer includes a liquid crystal lens having a large curvature radius to lengthen a focal distance and a light transmitting width of the barrier layer, when a viewer is further than an optimal viewing distance.

4. The stereoscopic image display device of claim 1, wherein:
the liquid crystal lens layer does not change an optical path of light emitted from the backlight unit when implementing a 2D image by blocking power applied to the first upper electrodes and the first lower electrodes.

5. The stereoscopic image display device of claim 1, wherein:
the liquid crystal lens layer supplies power to all of the first lower electrodes and to some of the first upper electrodes depending on a curvature radius of a liquid crystal lens, to change an optical path of light emitted from the backlight unit.

6. The stereoscopic image display device of claim 1, wherein:
a curvature radius of a liquid crystal lens is determined by an interval between first upper electrodes to which power is applied.

7. The stereoscopic image display device of claim 1, wherein:
the barrier layer includes
a third substrate;
a fourth substrate that faces the third substrate;
a reflective PDLC layer interposed between the third substrate and fourth substrate that includes the reflective PDLCs; and
a plurality of second lower electrodes disposed on the third substrate and a second upper electrode disposed on the fourth substrate.

8. The stereoscopic image display device of claim 7, wherein:
a light transmitting width of the barrier layer changes depending on a position of an interval between second lower electrodes to which power is applied.

9. The stereoscopic image display device of claim 7, wherein:
the barrier layer does not change an optical path of light emitted from the backlight unit when implementing a 2D image by blocking power applied to the second upper electrode and the second lower electrodes.

10. The stereoscopic image display device of claim 7, wherein:
the barrier layer supplies power to the second upper electrode and to alternating groups of one or more second lower electrodes to control a path of light propagating to a viewer's left and right eyes.

11. The stereoscopic image display device of claim 7, wherein:
the barrier layer reflects light toward the backlight unit in a region in which some of the plurality of second lower electrodes are supplied with power and transmits light in a region in which a remainder of the plurality of second lower electrodes are not supplied with power.

12. The stereoscopic image display device of claim 1, wherein:
a size of the nano PDLCs of the liquid crystal lens layer varies by position.

13. A stereoscopic image display device, comprising:
a liquid crystal lens layer that includes
a first substrate;
a second substrate that faces the first substrate;
a nano polymer-dispersed liquid crystal (PDLC) layer interposed between the first substrate and the second substrate that includes a plurality of nano polymer-dispersed liquid crystals (PDLCs); and
a plurality of first lower electrodes disposed on the first substrate and a plurality of first upper electrodes disposed on the second substrate,
wherein the nano PDLCs are randomly distributed in the nano PDLC layer, and
wherein a refractive index of the liquid crystal lens layer is changed by forming the nano PDLC into a lenticular lens whose shape depends on a position of the first upper electrodes to which power is applied; and
a barrier layer integrally formed under the liquid crystal lens layer that includes
a third substrate;
a fourth substrate that faces the third substrate;
a reflective PDLC layer interposed between the third substrate and fourth substrate that includes a plurality of reflective PDLCs; and
a plurality of second lower electrodes disposed on the third substrate and a second upper electrode disposed on the fourth substrate,
wherein a light transmitting width and position of the barrier layer changes depending on a position of an interval between second lower electrodes to which power is applied.

14. The stereoscopic image display device of claim 13, further comprising:
a display panel positioned over the liquid crystal lens layer that is configured to display an image; and
a backlight unit (BLU) positioned under the barrier layer that is configured to provide light to the display panel.

15. The stereoscopic image display device of claim 13, wherein the liquid crystal lens layer supplies power to all of the first lower electrodes and to some of the first upper electrodes depending on a curvature radius of a liquid crystal lens, to change an optical path of light emitted from the backlight unit, and
wherein the curvature radius of the liquid crystal lens is determined by an interval between first upper electrodes to which power is applied.

16. The stereoscopic image display device of claim 13, wherein the barrier layer supplies power to the second upper electrode and to alternating groups of one or more second lower electrodes to control a path of light propagating to a viewer's left and right eyes, and
wherein the barrier layer reflects light toward the backlight unit in a region in which some of the plurality of second lower electrodes are supplied with power and transmits light in a region in which a remainder of the plurality of second lower electrodes are not supplied with power.

* * * * *